United States Patent [19]

Lahouste et al.

[11] 4,020,021

[45] Apr. 26, 1977

[54] PROCESS FOR MANUFACTURING POLYMERS OF BICYCLO [2.2.1] HEPTENE-2 AND ITS SUBSTITUTION DERIVATIVES

[75] Inventors: Jean Lahouste, Verneuil-en-Halatte; Maurice Lemattre, Cinqueux; Jean-Claude Muller; Claude Stein, both of Verneuil-en-Halatte, all of France

[73] Assignee: Societe Chimique des Charbonnages, Courbevoie, France

[22] Filed: Mar. 25, 1975

[21] Appl. No.: 561,789

[30] Foreign Application Priority Data

Mar. 26, 1974 France .............................. 74.10368

[52] U.S. Cl. .............................. 260/2.5 H; 526/65; 526/73; 526/142; 526/169; 526/281; 526/909
[51] Int. Cl.$^2$ ...................... C08J 9/00; C08F 2/00; C08F 4/44; C08F 110/00
[58] Field of Search ............ 260/93.1; 526/65, 281, 526/909, 73, 2.5 H

[56] References Cited

UNITED STATES PATENTS

| | | |
|---|---|---|
| 3,330,815 | 7/1967 | McKeen et al. .................. 260/93.1 |
| 3,367,924 | 2/1968 | Rinehart .......................... 260/93.1 |
| 3,491,032 | 1/1970 | Skochdopole et al. ......... 260/2.5 H |
| 3,546,183 | 12/1970 | Vergne et al. .................... 260/93.1 |
| 3,608,031 | 9/1971 | Stastny et al. .................. 260/2.5 H |

Primary Examiner—Joseph L. Schofer
Assistant Examiner—Herbert J. Lilling
Attorney, Agent, or Firm—Karl W. Flocks

[57] ABSTRACT

Process for manufacturing finely divided polymers of bicyclo [2.2.1] heptene-2 compound comprising the steps of incompletely polymerizing said bicyclo [2.2.1] heptene-2 compound by the ring opening polymerizing technique in the presence of a catalyst system selected from the group comprising a compound of a noble metal of the platinum family and an alcohol-reducing solvent and tungsten hexachloride, an aluminum alkyl and an aromatic solvent, under superatmospheric pressure and in the presence of a quantity of solvent at least equal to that necessary for the solution of said catalyst system and abruptly reducing said pressure at a temperature higher than the vaporization temperature of the reaction mixture under said reduced pressure, whereby an expansion, a division and at least partial drying of the resulting polymer is obtained.

7 Claims, No Drawings

PROCESS FOR MANUFACTURING POLYMERS OF BICYCLO [2.2.1] HEPTENE-2 AND ITS SUBSTITUTION DERIVATIVES

FIELD OF THE INVENTION

The present invention relates to a process for manufacturing polymers of bicyclo[2.2.1]heptene-2, also known as norbornene and its substitution derivatives in a finely divided form.

BACKGROUND OF THE INVENTION

It is known that bicyclo[2.2.1]heptene-2 (norbornene) and its substitution derivatives with short lateral chains can be polymerized by ring opening in the presence, as catalysts, of compounds of noble metals and a reducing substance such as an alcohol (see Michelotti U.S. Pat. No. 3,336,275; Michelotti et al "Co-ordinate polymerization of the bicyclo[2.2.1]heptene-2 Ring System (Norbornene) in Polar Media", Journal of Polymer Science, Part A, 3 (1965), pages 895–905; Rinehart U.S. Pat. No. 3,367,924 and Rinehart et al, "The emulsion polymerization of the Norbornene Ring System catalyzed by noble metal compounds", Polymer Letters 3 (1965), pages 1049–1052). Alternatively, such a polymerization can be achieved in the presence of a tungsten compound together with a compound having at least one metal-hydrocarbon link (see French Patent No. 1,599,185).

Also a polymer of this kind can be used as a main macromolecular constituent in the preparation of elastomer compositions by combining the polymer with at least one compound having a low volatility and a freezing point less than −30° C., such as an ester or a mixture of hydrocarbons. This type of composition has been described by Vergne et al in U.S. Pat. No. 3,676,390 and in the above-cited French patent No. 1,599,185.

However, when bicyclo[2.2.1]heptene-2 or its substitution derivatives are polymerized using the known processes described above, there is obtained a compact mass which is more or less difficult to grind and to dry and more or less difficult to mix with compounds such as esters or hydrocarbons.

OBJECT OF THE INVENTION

It is, therefore, the principal object of the invention to provide a process which permits directly the simple and economic production of poly-norbornenes which are sufficiently divided to be capable of being subsequently easily mixed with the constituents which are necessary to obtain elastomer compositions. The invention concerns also, as new products, finely divided polymers of bicyclo[2.2.1]heptene-2 compounds having a low apparent bulk density from 0.2 to 0.8 and preferably from 0.25 to 0.4.

SUMMARY OF THE INVENTION

This object and others are achieved, in accordance with present invention, by incompletely polymerizing bicyclo[2.2.1]heptene-2 by the known ring opening technique in the presence of a suitable catalyst system, working under pressure, and in the presence of a quantity of a solvent at least equal to that necessary for dissolving the catalyst and abruptly reducing the pressure at a temperature higher than the vaporization temperature of the constituents of the reaction mixture under the said reduced pressure, which results in an at least partial expansion and drying of the polymer.

PREFERRED EMBODIMENTS

According to a preferred embodiment, the polymerization and the drying are carried out in an extrusion machine, preferably a double-screw extruding machine having zones of polymerization, expansion and drying.

For a given range of temperatures and pressures and for a given quantity of catalyst, the flow-rates of monomer and, if required, of solvent, are adjusted in such a manner that the quantity of volatile materials (monomer and solvent) leaving the polymerization zone, represents between 50 and 100% of the mass of polymer obtained. In this way, it is possible to regulate, for a given apparatus, the fineness of the granular size and the apparent density of the polymer(ASTM D 1895) by acting on the quantity of residual monomer and initial solvent.

The preferred catalyst system used in the invention is constituted by ruthenium trichloride dissolved in n-butanol.

The process according to the invention may be applied batchwise or in a continuous process.

The following examples illustrate the invention. In these examples, all the parts are by weight and a double-screw extrusion machine has been employed comprising at least one polymerization zone in which the pressure was maintained at between 3 and 7 bars and the temperature between 100° and 160° C. and at least one expansion and drying zone at 140°–180° C.

In the case of two expansion and drying zones, the first was maintained at atmospheric pressure, the second at 350–400 torr, each zone being isolated by a polymer plug. The catalyst of ruthenium chloride in solution n-butanol was a commercial catalyst $(RuCl_3 \cdot xH_2O)$.

EXAMPLE 1

A double-screw extrusion machine of 53 mm. in diameter was separated into several zones in the following manner:
2/5ths of the length into a polymerization zone terminated by 3 elements with reverse threads, each provided with two slots, displaced from one element to the other and followed by grinding elements;
1/5th of the length into a degassing zone at atmospheric pressure, this zone being terminated by a compression element constituted by grinders;
2/5ths of the length into a degassing zone under vacuum.

The second and the third zones are provided with degassing means leading to condensers. These zones are maintained at about 160°–170° C.

Into the first zone there are injected on the one hand 23 kg/hr of a mixture of 100 parts of norbornene and 15 parts of n-butanol and, on the other hand, 1200 cu.cm./hr of the solution of commercial $RuCl_3 \cdot xH_2O$ in the n-butanol at a concentration of 1 mg/cu.cm.

After polymerization and drying, there are obtained 14 kg/hr of poly-norbornene containing less than 0.5% of volatile materials of apparent density of 0.3. The rate of conversion is 70% for a consumption of 60 mg. of catalyst per kg. of monomer.

EXAMPLE 2

Into a double-screw extrusion machine of 87 mm. in diameter, divided into three zones of equal length, there are injected 35 kg/hr of monomer under the same conditions of dilution as in Example 1. On the other hand, a quantity of catalyst (RuCl$_3$) in solution in butanol is injected so that the concentration of catalyst is 58 mg. per kg. of monomer. There are thus obtained 28 kg/hr of polymer of apparent density of 0.35, or a yield of 80%.

EXAMPLE 3

Into the double-screw extrusion machine described in Example 2, there are injected 35 kg/hr of norbornene containing 25 parts of n-butanol for 100 parts of norbornene. Furthermore, the catalyst is injected under the same conditions as in Example 2. There are thus obtained 28.4 kg/hr of polymer having an apparent density of 0.39.

EXAMPLE 4

Into the double-screw extrusion machine of Example 2 there are injected 35 kg/hr of pure norbornene. In addition, a solution of catalyst is injected under the following conditions:
Concentration of RuCl$_3$ in the butanol: 2 mg/cu.cm.;
Quantity of catalyst per kg. of monomer: 60 mg/kg.

Under identical conditions, a rate of conversion of 67.2% is obtained. The apparent density of the polymer is 0.41.

The process illustrated in these examples does not make use of an additional solvent and it is possible to re-cycle the bicyclo-heptene which is not polymerized directly from the condensers, simply by taking care to eliminate the quantity of butanol utilized to carry away the catalyst in order to prevent enrichment in butanol. This can be easily effected by distillation at atmospheric pressure, with an azeotrope of 87% of bicyclo-heptene and 13% of butanol. It is of course possible to obtain the same result by adding a portion of fresh bicyclo-heptene not containing butanol.

EXAMPLE 5

Under the conditions of Example 1, there are injected:
70 parts of norbornene not containing butanol;
30 parts of norbornene obtained from re-cycling;
15 parts of n-butanol coming from re-cycling;
5 parts of pure n-butanol containing 1 mg. per cu. cm. of RuCl$_3$.

There is obtained a rate of conversion of 67% for a flow-rate of polymer of 13 kg/hr, the polymer having an apparent density of 0.25.

EXAMPLE 6

A double-screw extrusion machine having a diameter of 53 mm. is separated into three zones in the following manner:
1/3rd of the length into a polymerization zone terminated by an element with a reverse thread;
1/3rd of the length into a degassing zone at atmospheric pressure. The polymer plug is retained by a grinding element with reverse thread;
1/3rd of the length into a degassing zone under vacuum, this zone being terminated by elements ensuring compression of the polymer.

Into this extrusion machine there are injected 100 parts of norbornene coming from the synthesis unit, 15 parts of fresh n-butanol and 5 parts of n-butanol containing 1 mg. of RuCl$_3$.x H$_2$O per cu.cm. of n-butanol. The production of polymer is 11.8 kg/hr.

Under these conditions, a conversion rate of 64.5% is obtained, the polymer having an apparent density of 0.240 and containing less than 0.5% of volatile materials.

EXAMPLE 7

The conditions of Example 6 are reproduced, except that a heat exchanger permits the injection into the extrusion machine of a mixture of norbornene and n-butanol at a temperature higher than its boiling point at atmospheric pressure. The solution of catalyst is injected at ambient temperature. The injection pressure being a function of the pressure inside the polymerization zone, this latter has been maintained at 3 to 3.5 bars by adopting a suitable profile of temperatures.

Under these conditions, there was obtained a rate of conversion of 69% for a production of 14 kg/hr of poly-norbornene. The polymer contained less than 0.5% of volatile materials and had an apparent density of 0.28.

EXAMPLE 8

A double-screw extruding machine of 53 mm. diameter is divided up in the following manner:
3/5ths of the length into a polymerization zone, terminated by a reverse thread,
1/5th of the length into an expansion drying-zone at atmospheric pressure, this zone being terminated by grinders in compression,
1/5th of the length into an expansion drying-zone under vacuum, terminated by grinders.

Under these conditions, 25.3 kg/hr of norbornene containing 20 parts of n-butanol for 100 parts of monomer and 60 mg of RuCl$_3$.xH$_2$O to 1 kg of monomer are injected. Under these conditions, a rate of conversion of 71% is obtained and the polymer produced has the following characteristics:
Proportion of volatile materials: 1%
Apparent density: 0.238.

EXAMPLE 9

A double-screw extrusion machine having a diameter of 87 mm. is separated into two zones:
1/3rd of the length into a polymerization zone, terminated by an element with a reverse thread;
2/3rds of the length into a drying and expansion zone. The evacuation of the volatile substances is effected by two pipes provided in this zone. The zone is terminated by elements acting solely in compression.

In the conditions of Example 8, there was obtained a production of 27 kg/hr of polymer with an apparent density of 0.33, or a rate of conversion of 77%. The proportion of volatile materials in the polymer was less than 0.8%.

The process according to the invention is also applicable to the polymerization of norbornene by catalysts of the Ziegler type (especially catalysts based on tungsten hexachloride and alkyl aluminum). This method implies the necessity of having the supply of monomer to the extrusion machine and a catalyst protected from oxygen and moisture.

Technologically, the process is the same, except that the two constituents of the catalyst must be injected by two independent dosing pumps.

EXAMPLE 10

10 kg/hr of norbornene are injected into the extrusion machine of Example 1. On the other hand, there is injected a catalyst composed of WCl$_6$ and aluminum tri-isobutyl, all in solution in toluene. The ratio of aluminum to tungsten is 7.5 and the concentration of tungsten is $2.10^{-3}$ mol per mol of norbornene. There is thus obtained a poly-norbornene having an apparent density of 0.8.

It will furthermore be understood that the present invention has been described purely by way of explanation and not in any restrictive sense and that any useful modification may be made thereto without departing from its scope as defined in the appended claims.

We claim:

1. In a method for manufacturing finely divided expanded ring opened polymers comprising polymerizing a bicyclo [2.2.1.] heptene-2 compound in the presence of a catalyst system selected from the group consisting of a noble metal compound with a reducing substance and a tungsten compound with a compound having at least one metal-hydrocarbon link, the improvement comprising:
    effecting said polymerization in a polymerization zone under super-atmospheric pressure and at an elevated temperature, passing the obtained mixture into an expansion zone maintained at a pressure substantially lower than that of said polymerizing zone and at a temperature higher than the vaporization temperature of the constituents of the reaction mixture to thereby simultaneously blow the so obtained polymer and dry said polymer, and dividing the resultant polymer to provide an apparent density from 0.2 to 0.8.

2. Method in accordance with claim 1, wherein said ring opening polymerization is carried out in a double-screw extrusion machine having at least one expansion zone of reduced pressure upstream from the extrusion end thereof.

3. Method in accordance with claim 1 wherein, for a given range of temperatures and pressures and for a given quantity of catalyst, the flow-rates of said bicyclo [2.2.1.] heptene-2 and of the other constituents of the reaction mixture which may comprise a solvent are adjusted in order that the quantity of volatilisable materials leaving said polymerization zone represents between 50 and 100% of the weight of the resulting polymer.

4. Method in accordance with claim 1 wherein the polymerization is carried out in the presence of ruthenium trichloride dissolved in n-butanol.

5. Method in accordance with claim 1 wherein the polymerization is carried out in the presence of tungsten hexachloride, an aluminum alkyl and an aromatic solvent.

6. Method in accordance with claim 2 wherein said elevated temperature is from 100° C to 160° C in said polymerizing zone and from 140° C to 180° C in said expansion zone.

7. A process for manufacturing finely divided and expanded ring-opened polymers of bicyclo [2.2.1] heptene-2 having an apparent density of 0.2 to 0.8, comprising
    polymerizing said bicyclo [2.2.1] heptene-2 under super-atmospheric pressure and at an elevated temperature by the ring opening polymerization technique, in the presence of a catalyst selected from the group consisting of a compound of a noble metal of the platinum family with an alcohol-reducing solvent and tungsten hexachloride with an aluminum alkyl and an aromatic solvent, the quantity of solvent at least being equal to that necessary to solubilize said catalyst system,
    reducing the pressure and simultaneously increasing the temperature to a temperature higher than the vaporization temperature of the solvent and any unreacted monomer, and thereby simultaneously blowing ring-opened polymer, drying said polymer and dividing said polymer into particulate form.

* * * * *